(12) United States Patent
Ahmed et al.

(10) Patent No.: US 12,493,562 B2
(45) Date of Patent: Dec. 9, 2025

(54) MEMORY ACCESS ENGINE

(71) Applicants: Advanced Micro Devices, Inc., Santa Clara, CA (US); ATI Technologies ULC, Markham (CA)

(72) Inventors: Omar Fakhri Ahmed, Markham (CA); Norman Vernon Douglas Stewart, Markham (CA); Mihir Shaileshbhai Doctor, Santa Clara, CA (US); Jason Todd Arbaugh, Austin, TX (US); Milind Baburao Kamble, Austin, TX (US); Philip Ng, Markham (CA); Xiaojian Liu, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/957,742

(22) Filed: Sep. 30, 2022

(65) Prior Publication Data
US 2024/0111688 A1    Apr. 4, 2024

(51) Int. Cl.
*G06F 12/109*    (2016.01)

(52) U.S. Cl.
CPC ...... *G06F 12/109* (2013.01); *G06F 2212/657* (2013.01)

(58) Field of Classification Search
CPC .................................................... G06F 12/109
See application file for complete search history.

(56) References Cited

U.S. PATENT DOCUMENTS

| | | | | |
|---|---|---|---|---|
| 2014/0237609 | A1* | 8/2014 | Sharp | G06F 21/50 726/26 |
| 2018/0232320 | A1* | 8/2018 | Raval | G06F 12/1081 |
| 2019/0391927 | A1* | 12/2019 | Tsirkin | G06F 12/145 |
| 2023/0176979 | A1* | 6/2023 | Shulyak | G06F 12/1036 711/205 |

* cited by examiner

*Primary Examiner* — Baboucarr Faal
(74) *Attorney, Agent, or Firm* — Volpe Koenig

(57) ABSTRACT

A technique for servicing a memory request is disclosed. The technique includes obtaining permissions associated with a source and a destination specified by the memory request, obtaining a first set of address translations for the memory request, and executing operations for a first request, using the first set of address translations.

20 Claims, 5 Drawing Sheets

MEMORY ACCESS ENGINE

BACKGROUND

Devices often request large blocks of memory be copied. Further, such requests are often made in a virtual memory address space. The complexity of such operations necessitates care in processing such requests.

BRIEF DESCRIPTION OF THE DRAWINGS

A more detailed understanding can be had from the following description, given by way of example in conjunction with the accompanying drawings wherein.

DETAILED DESCRIPTION

A technique for servicing a memory request is disclosed. The technique includes obtaining permissions associated with a source and a destination specified by the memory request, obtaining a first set of address translations for the memory request, and executing operations for the first request, using the first set of address translations.

Figure 1:
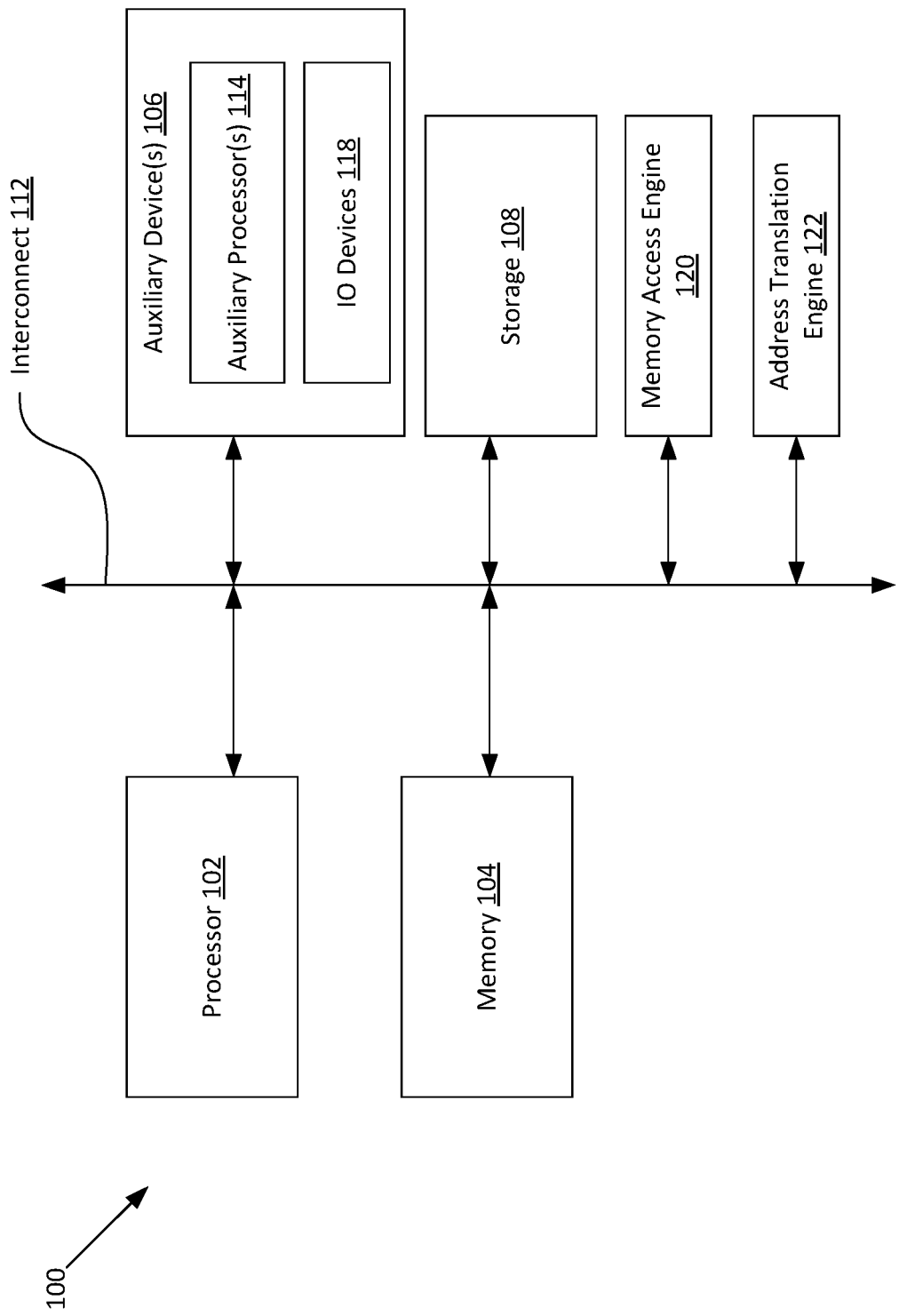
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, a storage 108, a memory access engine 120, and an address translation engine 122. An interconnect 112, which can be a bus, a combination of buses, and/or any other communication component, communicatively links the one or more processors 102, the memory 104, the one or more auxiliary devices 106, the storage 108, the memory access engine 120, and the address translation engine 122.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more IO devices 118 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

The memory access engine 120 is a hardware accelerator that accepts memory commands from clients of the device 100 and executes those memory commands. The memory commands include commands to read, write, move, or otherwise access data memory. It is possible for the memory commands to specify data to be accessed in an address space other than the physical address space, such as a virtual address space. A physical address space is a lower level address space than a virtual address space. A virtual address space is a re-mapping of the physical address space that exists for reasons such as security, ease of access, and other reasons. An address translation engine 122 exists to translate addresses from a virtual address space to a physical address space. The address translation engine 122 receives requests to translate addresses from a virtual address space to a physical address space, processes those request by performing lookup operations (e.g., into a translation lookaside buffer, one or more page tables, or other structures), and returns translated addresses to the requestor.

In addition to the above, it is possible for the device 100 to support multiple virtual machines. A virtual machine is a virtualized hardware device. A device 100 can execute multiple virtual machines concurrently. Each virtual machine is provided with a virtualized set of hardware resources such as processing resources, memory resources, input/output resources, and other resources. Each virtual machine is assigned a guest physical address space, which represents a virtualized physical address space. Guest physical addresses are in contrast with system physical addresses, which are the true physical addresses of the hardware of the device 100. A hypervisor manages mappings between guest physical addresses and system physical addresses, and software running in the virtual machines (e.g., an operating system) manages mappings between guest virtual addresses and guest physical addresses. Guest virtual addresses are virtual addresses for software of the virtual machines. It should be understood that, typically, to software executing in a virtual machine, guest virtual addresses appear as "real" virtual addresses and guest physical addresses appear as "real" physical addresses. The hypervisor secures the resources of different virtual machines with respect to each other, preventing one virtual machine from accessing (e.g., reading or writing) resources (e.g., memory) of another machine unless permission information permits such accesses.

If permitted, it is possible for software executing in one virtual machine to be permitted to communicate with software in another virtual machine. For example, it is possible for software executing on one virtual machine to request transfer of data to a different virtual machine, if such action is permitted. It is also possible for the software to request additional processing be performed on that data, such as compression, encryption, decryption, decompression, or other processing be performed on the data in the course of transferring the data to the other virtual machine. The hypervisor stores permissions data that indicates whether such transfers or other operations are permitted. Example uses of such capabilities include the ability to copy an instance of execution of program from one virtual machine to another. In an example, a user controls a number of virtual machines and wishes to copy an instance of execution of a program from one virtual machine to another virtual machine. Typically, copying between virtual machines is not permitted, for security reasons. However, it is possible for a user to permit specific instances of copying for specific purposes (e.g., through a user interface for a hypervisor or some other mechanism).

In addition, it is possible for the commands for transfer of data to specify a contiguous range of memory addresses to be accessed (e.g., copied), where such a range does not map to a contiguous range of physical address spaces. For example, a single command to copy data from one contiguous set of guest virtual addresses to another contiguous set of guest virtual addresses address in a different virtual machine may map to multiple ranges of addresses in the guest physical address space of either virtual machine and/or to multiple ranges of addresses in a system physical address space, where the multiple ranges of addresses are not contiguous with each other.

The memory access engine 120 provides hardware acceleration for the memory operations described above, including copying between address spaces, transformations, and other operations. The memory access engine 120 and address translation engine 122 are both implemented as hardware circuitry configured to perform the steps described herein, a programmable processor configured to perform the steps described herein, software executing on a processor configured to perform the steps described herein, a combination of one or more of the above, or in any other technically feasible manner.

Figure 2:
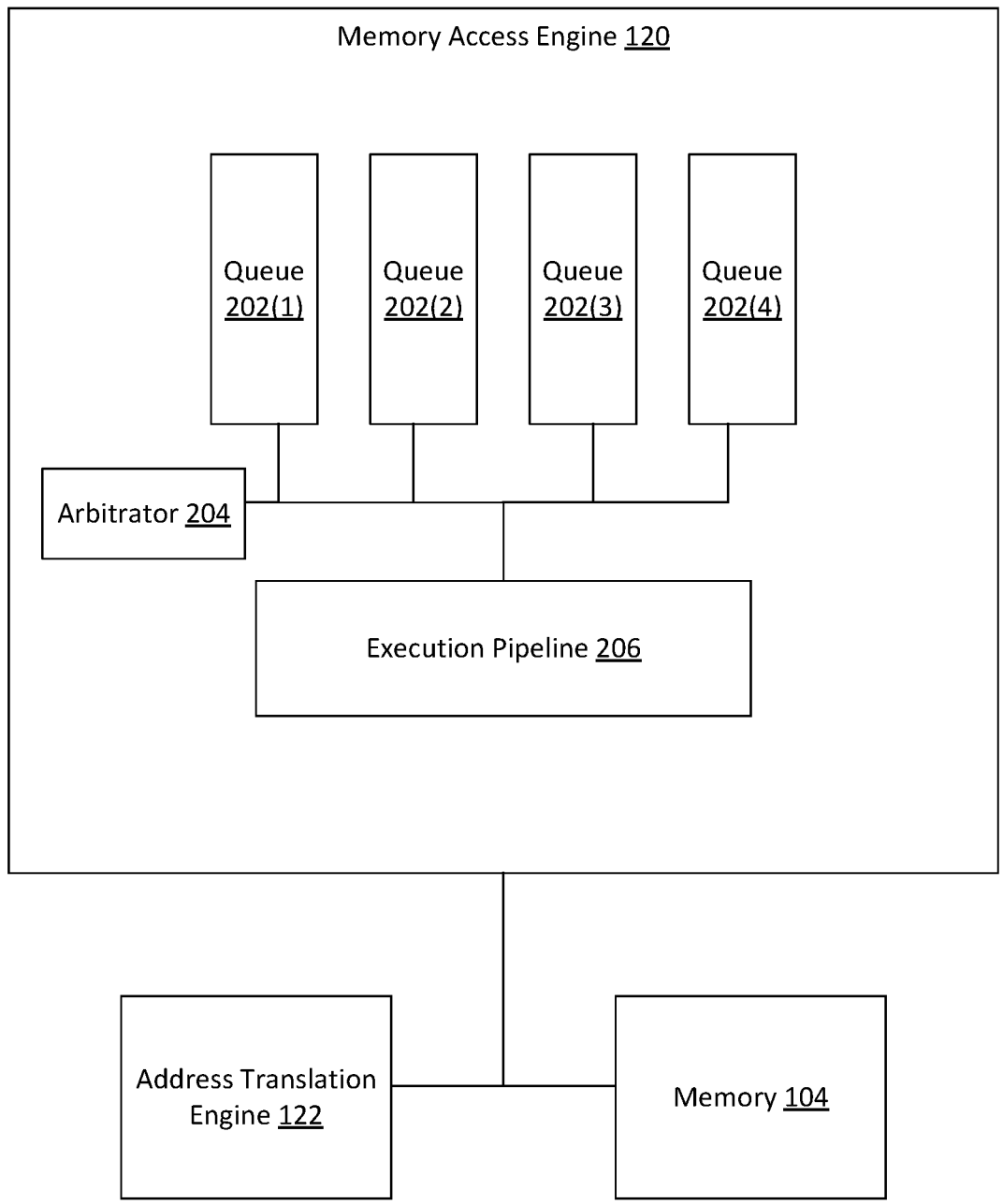
FIG. 2 illustrates details of the memory access engine according to an example.

FIG. 2 illustrates details of the memory access engine 120 according to an example. The memory access engine 120 includes an execution pipeline 206, an arbitrator 204, and a plurality of queues 202. The execution pipeline 206 receives and executes memory commands from one or more clients. In various examples, the clients execute on one or more of the processor 102, the auxiliary processor 114, the IO devices 118, or any other technically feasible component of the device 100. In some examples, a client is a software entity (such as a program, process, thread, or other instance of execution) executing within a virtual machine.

As stated above, the received commands specify memory addresses in a virtual addressing space. Thus, the execution pipeline 206 performs address translation steps by requesting the address translation engine 122 translate the involved addresses from the virtual address space to the physical address space. In addition, the received commands may specify one or more operations to perform for the specified addresses. These one or more operations include operations such as reading, writing, a combination thereof (e.g., copying), or other commands for memory. Once the execution pipeline 206 has received address translations, the execution pipeline 206 performs the requested commands, utilizing the physical addresses specified by the address translations.

In addition to the above, the device 100 stores permissions information that indicate source and destination permissions that indicate whether a memory operation (e.g., a copy or a copy with additional processor) from the source to the destination is permitted to occur. In some examples, the memory access engine 120 receives a command that specifies one or more memory accesses, a source, and a destination, obtains permissions that indicate whether such accesses are permitted to occur, and performs or does not perform those accesses based on the permissions. The source and destination can be software entities executing within different virtual machines.

As stated above, it is possible for a small number of individual commands received by the memory access engine 120 to result in a large number of operations performed by the execution pipeline 206. In an example, for one command, which references a single contiguous range of virtual memory addresses, the corresponding physical addresses include multiple address ranges that are not necessarily adjacent to each other in the physical address space. Therefore, such a command would result in multiple operations, including at least one address translation for each of the address ranges in the physical address space. In addition, the address translation, itself, requires a certain number of operations to be performed. For example, the address translation requires one or more requests to the address translation engine 122. In addition, the act of accessing and verifying the permissions for memory access commands being performed between a source and a destination requires a series of operations. For this reason, the execution latency for memory commands issued to the memory access engine 120 can be quite high. In other words, the time from issuing a command to completing a command can be quite high, since permissions need to be checked, addresses for source and destination need to be translated, and commands for performing the actual accesses need to be generated, issued, and completed. If performed solely in software (e.g., executing in an operating system on the processor 102), this activity would be performed as a series of commands issued and executed sequentially.

To combat this latency, the memory access engine 120 utilizes a set of input queues 202, an arbitrator 204, and an execution pipeline 206 having a pipelined architecture. These features serve to hide the latency of the individual commands by allowing many commands to be in-flight at the same time. While any individual command may have a large amount of execution latency, the overall throughput of commands through the memory access engine 120 (e.g., the execution pipeline 206) is high due to the above features.

The input queues 202 include multiple queues, each of which is assigned to one or more clients. A client is an entity such as a processor 102, an auxiliary processor 114, an IO device 118, or another entity. In some implementations, each queue 202 is configured to receive memory access commands 304 from the one or more clients assigned to that queue 202 and not from any other client. Thus, in such implementations, each queue 202 stores commands from the assigned set of clients and not from other clients. In some implementations, the queues 202 are first-in-first-out queues, but the queues 202 can be implemented in any technically feasible manner.

The arbitrator 204 selects commands from the queues 202 to provide to the execution pipeline 206. The arbitrator 204 attempts to ensure fairness, for example, by using a round-robin schedule, where each queue 202 takes turns having one or more commands sent to the execution pipeline 206. In some examples, attempting to ensure fairness includes the arbitrator 204 attempting to ensure that each queue 202 progresses. In some examples, attempting to ensure fairness includes upon detecting that the execution pipeline 206 has available capacity, the arbitrator 204 provides one or more commands from a queue 202 to the execution pipeline 206.

The execution pipeline 206 has a plurality of stages. As is known, the execution pipeline 206 operates according to a clock, where processes advances on each clock tick. Each stage of the execution pipeline 206 produces a result that is fed to the subsequent stage when a clock tick occurs. Each stage has a particular functionality, such as calculating an address, constructing a command, outputting a command to another unit (e.g., the address translation engine 122 or the memory 104), or another function. Thus, there can be many commands "in flight" in the execution pipeline 206, each at a different point in execution.

The execution pipeline 206 receives commands that specify memory addresses in a virtual address space (e.g., a guest virtual address space), as well as memory operations to perform with those memory addresses. In some examples, the commands also specify a source virtual machine and a destination virtual machine. In some examples, the memory operations include copy commands that include copying data from a set of addresses of the source virtual machine to the set of addresses of the destination virtual machine. The execution pipeline 206 generates commands to translate these addresses into the physical address space and issues the commands to the address translation engine 122. Upon receiving the translated addresses, the execution pipeline 206 generates commands to the memory 104 based on the received, translated physical addresses and the operations specified by the commands received by the memory access engine 120. The execution pipeline 206 performs those commands, causing the specified operations to occur with the translated physical addresses.

Figure 3:
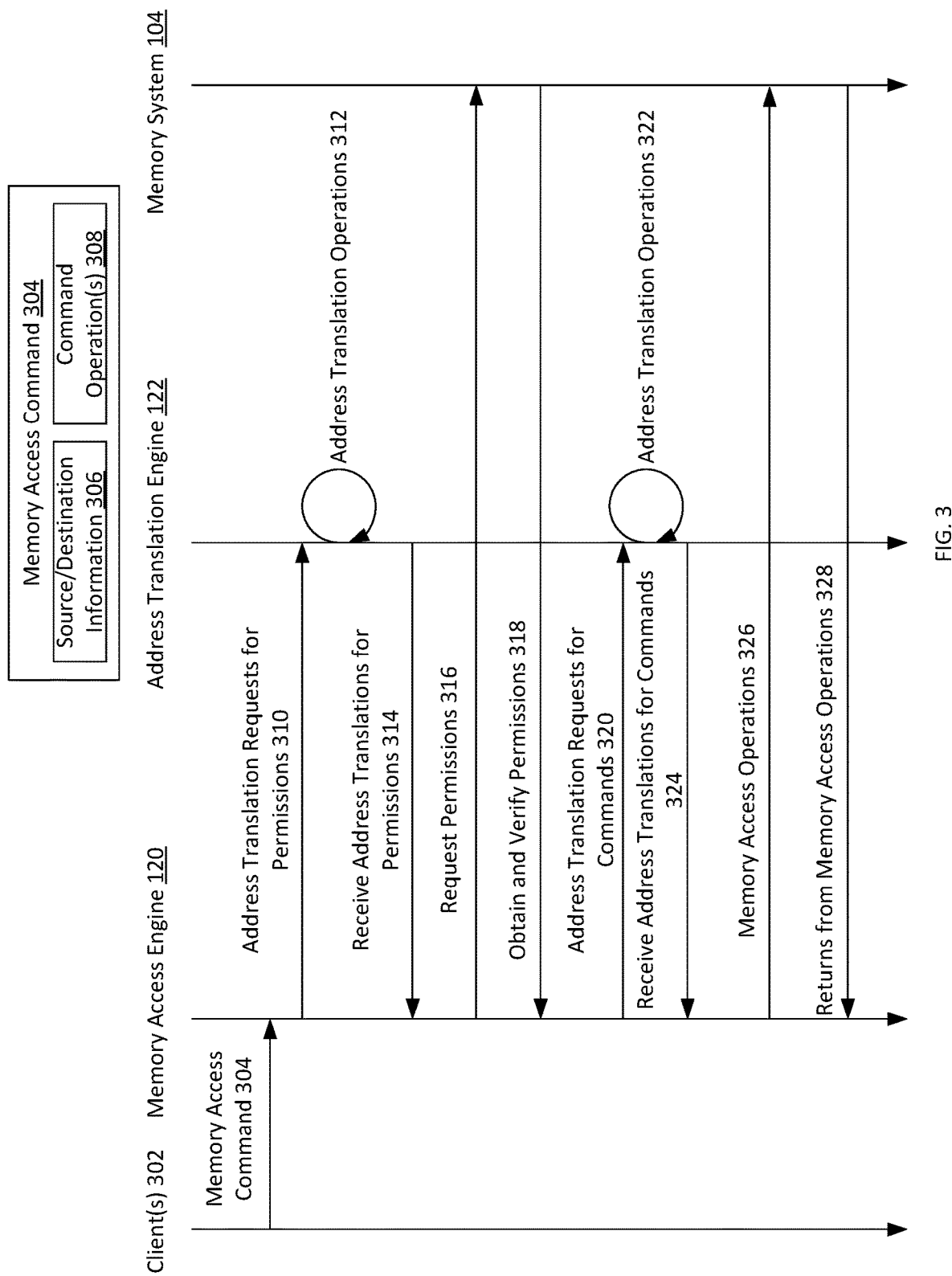
FIG. 3 illustrates transactions between elements of the device for executing a set of memory operations, according to an example.

FIG. 3 illustrates transactions between elements of the device 100 for executing a set of memory operations, according to an example. One or more clients 302 sends a memory access command 304 to the memory access engine 120 for execution. The memory access command 304 specifies source and destination information 306, and one or more command operations 308. The command operations 308 include one or more read or write operations, and/or other operations for memory access and/or data transformation. In some examples, the source and destination information 306 includes an indication of a source and an indication of a destination. In some examples, the indication of the source indicates a virtual machine and a virtual address range. Similarly, in some examples, the indication of the destination indicates a virtual machine and a virtual address range. Thus, the memory access command 304 indicates that memory operations should be performed for a memory address range on a source virtual machine to a memory address range on a destination virtual machine. In some examples, the source virtual machine and the destination virtual machine are different virtual machines or the same virtual machines. In some examples, the virtual address ranges are guest virtual addresses and in some examples, the virtual address ranges are guest physical addresses.

Any entity in the device 100 could generate a memory access command 304 and send that memory access command 304 to the memory access engine 120 for execution. In some examples, the entity comprises a software entity such as a program, operating system, or device driver, or a hardware entity such as a physical subsystem of the device 100.

In general, to process the memory access command 304, the memory access engine 120 performs the following operations. The memory access engine 120 accesses permissions information to determine whether the virtual machine associated with the source (the "source virtual machine") is permitted to write to memory associated with the virtual machine associated with the destination (the "destination virtual machine"), and also whether the virtual machine associated with the destination is permitted from data provided by the virtual machine associated with the source. In some examples, this permission information is specified at the granularity of virtual address ranges. In other words, in some examples, permission information indicates, for the source virtual machine, which address ranges of the destination virtual machine the source virtual machine is permitted to write into and also, for the destination virtual machine, which address ranges of the source virtual machine the destination machine is permitted to read from. Once the permissions are obtained, the memory access engine determines whether the permissions allow the requested operations 308 and, if so, performs the requested operations. In the course of the above operations, the memory access engine 120 performs the address translations that are necessary for each of the individual operations necessary to perform the memory access command 304. The above operations are illustrated with respect to FIG. 3.

As shown in FIG. 3, the memory access engine 120 processes the memory access command 304 in the following manner. At operation 310, the memory access engine 120 sends requests to the address translation engine to translate the addresses of metadata that stores permissions information. As described above, this permissions information indicates whether the request memory operations between virtual machines are permitted to occur. At operation 312, the address translation engine 122 performs the requested address translations and at operation 314, the address translation engine 122 returns the address translations to the memory access engine 120.

At operation 316, the memory access engine 120 requests permissions from the metadata for which address translations have been received. In some examples, requesting permissions 316 includes one or more additional address translation steps (not shown). For example, operation 316 could involve requesting metadata which includes one or more addresses to permissions data. The addresses to permissions data could need to be translated by the address translation engine 122. In this situation, the memory access engine 120 fetches the addresses of the permissions data from the metadata, requests the address translation engine 122 to translate those addresses, receives the translated addresses, and requests the permissions from memory.

At operation 318, the memory access engine 120 obtains the permissions from memory in response to operation 316. The memory access engine 120 also verifies the permissions to determine whether the requested operations are permitted. This verification includes determining whether the source virtual machine is permitted to write to the destination addresses and whether the destination virtual machine is permitted to read from the source addresses. If verification does not pass (either the source virtual machine is not permitted to write to the destination address or the destination virtual machine is not permitted to read from the source address), then the additional steps illustrated are not performed and the memory access engine 120 informs the client 302 that the command could not be processed. If verification does pass, then the additional illustrated operations are performed.

At operation 320, the memory access engine 120 requests the address translation engine 122 to perform address translation for the addresses involved in memory operations (e.g., copying or other options), as specified by the memory access command 304 (e.g., in the source/destination information 306). Again, these addresses specify the location from which copying occurs in the source and the location to which copying (or other transfer) occurs in the destination. At operation 322, the address translation engine 122 performs the requested translations and, at operation 324, the address translation engine 122 returns the translated addresses to the memory access engine 120.

At operation 326, the memory access engine 120 performs the memory access operations as specified by the memory access command 304. Again, these memory access operations include reading data from the source (e.g., source virtual machine and memory address), optionally perform a data transform on the read data (e.g., compression, decompression, or any other specified form of data transform), and writing the transformed or untransformed data to the destination (e.g., destination virtual machine and memory addresses). At operation 328, the memory system 104 provides returns back to the memory access engine 120. These returns can include acknowledgments or other information such as the results of a read-modify-write operation (e.g., the value originally at the targeted memory location), or any other information that is the result of an operation on the memory system 104.

As indicated elsewhere herein, the memory access engine 120 is pipelined. Therefore, the memory access engine 120 performs any of the operations 310-328 for one particular memory access command 304 while performing any other of the operations 310-328 for a different memory access command 304. In some examples, the memory access engine 120 includes a series of stages, where at any given time, each stage performs one or more of the operations (e.g., operations illustrated in FIG. 3) for executing a different memory access command 304. In an example, one stage of the memory access engine 120 issues address translation requests for permissions (operation 310) for one memory access command 304 while a different stage of the memory access engine 120 requests permissions (operation 316) for a different memory access command 304. In general, the pipelined nature of the memory access engine 120 greatly increases the throughput of the operations for processing memory access commands 304 as compared with performing such operations in software (e.g., in the hypervisor), which would serialize the commands, rather than perform the commands concurrently, by performing all steps of one command before beginning a different command.

Figure 4:
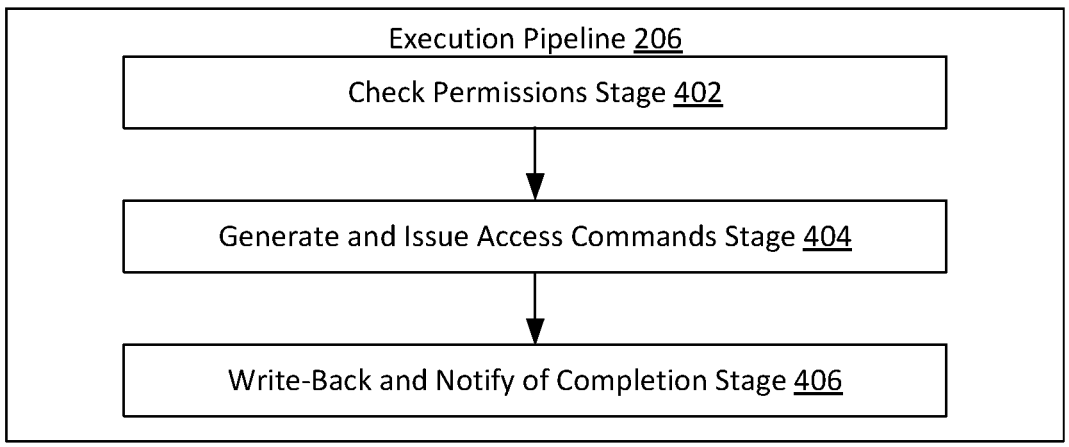
FIG. 4 illustrates a pipelined execution pipeline, according to an example.
Figure 4:
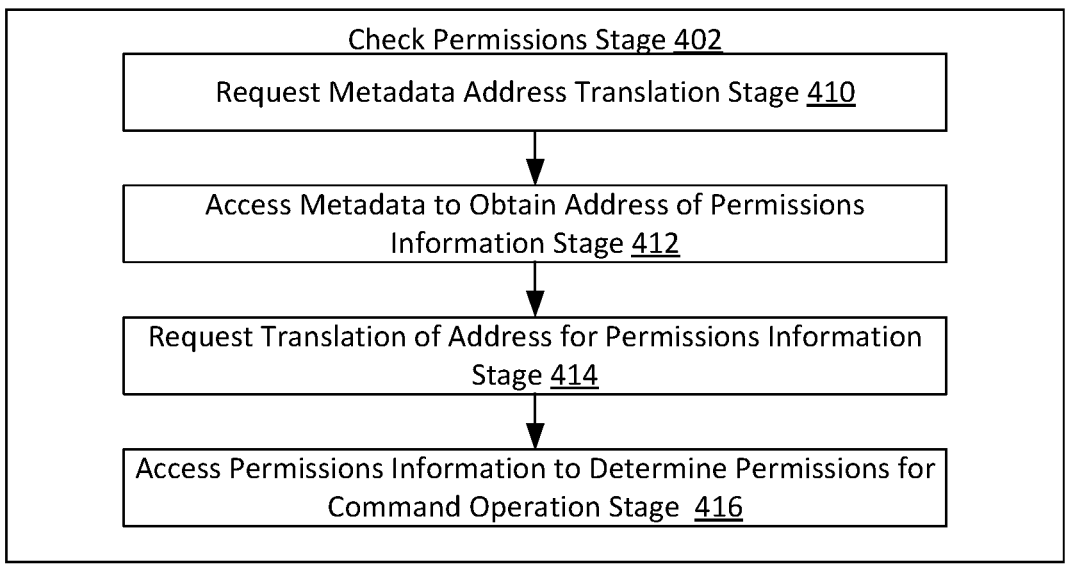
Figure 4:
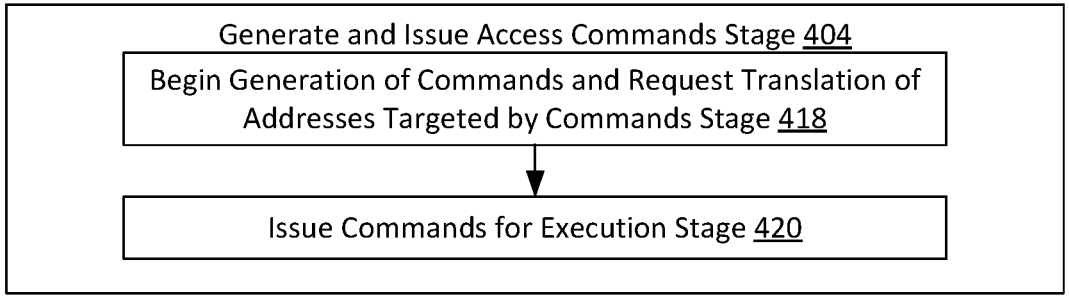

FIG. 4 illustrates an example execution pipeline 206. The example execution pipeline 206 includes three stages, but it should be understood that the execution pipeline 206 can be implemented with any number of stages. Further, FIG. 4 illustrates a number of substages (410-416 and 418-420) for stage 402 and stage 404, respectively. These substages represent additional stages that could be used to implement stage 402 and stage 404, respectively. As described above, each stage is capable of executing operations for one memory access command 304 while a different stage is performing operations for a different memory access command 304.

The example execution pipeline 206 includes the check permissions stage 402, the generate and issue access commands stage 404, and the write-back and notify of completion stage 406. The check permissions stage 402 checks the permissions for the operations specified by the memory access command 304. In an example, the memory access command 304 indicates that transfer of data from a source to a destination is to occur. In this example, the check permissions stage 402 checks metadata that indicates whether the source is permitted to write to the destination and/or whether the destination is permitted to read from the source. As described elsewhere herein, the check permissions stage 402 may include a number of sub-operations, including translating addresses for metadata, reading the metadata using the translated addresses to obtain addresses for permissions information, fetching the permissions information, and determining whether the operations are to occur based on the permissions information.

The generate and issue access command stage 404 generates and issues access commands to the memory system 104 according to the memory access command 304. In an example, the memory access command 304 specifies that data is to be transferred from a source to a destination. The generate and issue access command stage 404 generates commands for such transfer. In examples, generating these commands includes translating virtual addresses specified for the source and destination in the memory access command 304 into physical addresses and generating commands to perform the memory transfer and/or other operations based on the translated addresses.

The write-back and notify of completion stage 406 notifies the requester (i.e., client 302) that the operations are complete and also writes back any data that is to be written back. In the example of a read-modify-write operation, the written back data is the original data stored at the memory locations. The commands 304 may specify the data that is to be written back.

Stages 410-416 illustrate sub-stages of the check permissions stage 414. The request metadata address translation stage 410 includes generating requests for translating addresses of metadata that directly or indirectly indicates permissions. Stage 412 includes accessing the metadata to obtain addresses for the permissions information. More specifically, once the addresses of the metadata are obtained, this stage uses the addresses to fetch the actual metadata, which contains permissions information. Stage 414 requests translation of the addresses of the permissions information. Stage 416 obtains the permissions information and examines the permissions information to determine whether the operations of the command 304 are permitted, as described elsewhere herein.

Stages 418 and 420 illustrate sub-stages of the generate and issue access command stage 404. Stage 418 includes generating commands and requesting translation of addresses targeted by the commands. The generated commands are commands to transfer data from source to destination, and, optionally, to perform additional data transformation on the transferred data. Stage 420 includes receiving translated addresses and issuing the generated commands based on the translated addresses.

It is possible for any stage of the execution pipeline 206 to send out one or more requests (e.g., to the address translation engine 122 or memory system 104) as needed. In an example, the source/destination information 306 specifies multiple memory address ranges, or specifies a memory address range that requires multiple translations, in which case the memory access engine 120 generates, for a single memory access command 304 multiple requests for address translation to the address translation engine 122. In any of these cases, the appropriate stage of the execution pipeline 206 generates and outputs multiple such requests.

Figure 5:
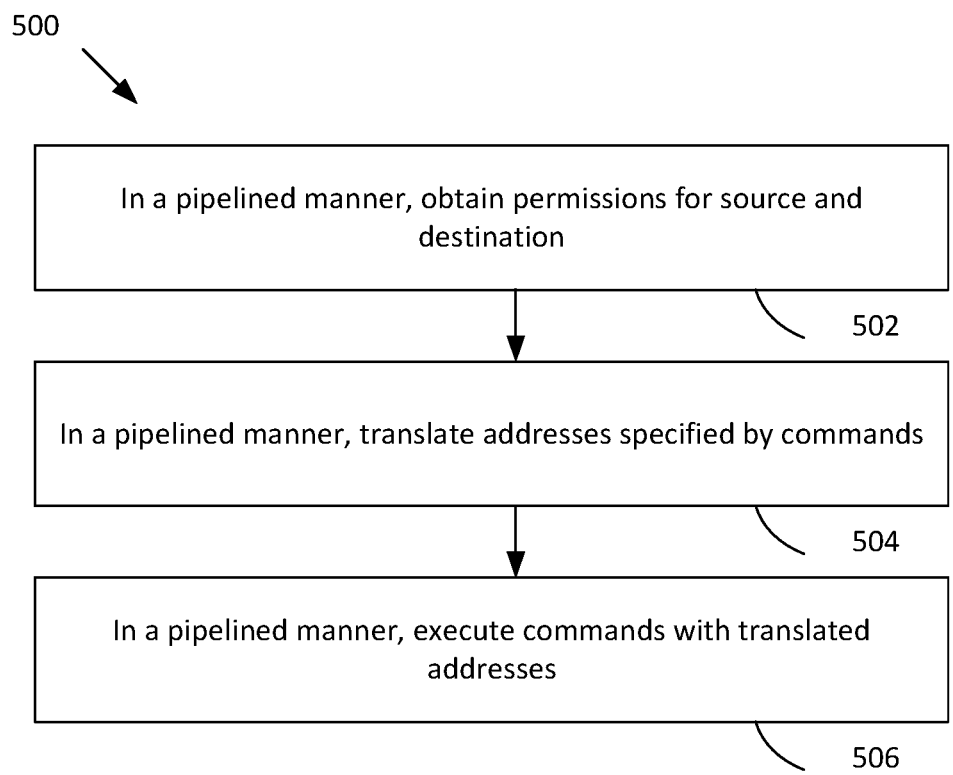
FIG. 5 is a flow diagram of a method for performing memory operations, according to an example.

FIG. 5 is a flow diagram of a method 500 for performing memory operations for a memory access command 304, according to an example. Although described with respect to the system of FIGS. 1-4, those of skill in the art will recognize that any system, configured to perform the steps of the method 500 in any technically feasible order, falls within the scope of the present disclosure.

Prior to the steps of the method 500, a client 302 generates a memory access command 304 and transmits the memory access command 304 to the memory access engine 120. As described elsewhere herein, the client 302 is a software or hardware entity of the device 100 and can be associated with a virtual machine. The memory access commands 304 specify a source and a destination as well as one or more command operations. The source and destination specify a virtual machine and address range and the command operations specify what operations to perform with the source and destination. The operations to perform can include copying, and various transforms that can be performed on the data from the source in the course of transmitting the data to the destination.

At step 502, a memory access engine 120, in a pipelined manner, obtains permissions for a source and a destination specified by a memory access command 304. In an example, the memory access command 304 specifies a source and a destination as well as operations to perform between the source and the destination. In some examples, the source information specifies a virtual machine and an address range for a source and the destination information specifies a virtual machine and an address range for a destination.

In some examples, the permissions indication indicates whether the source is permitted to write to the destination and whether the destination is permitted to receive data from the source. In some examples, the memory access engine 120 stores or receives virtual addresses for metadata information. The metadata information includes at least a part of a virtual address for permissions information. In such examples, step 502 includes translating the addresses for the metadata, reading the metadata using the translated addresses, to obtain an address of permissions, translating the address of permissions, and fetching and reading the permissions information. If the permissions information indicates that the operations requested in the memory access command 304 are permitted, then the method 500 proceeds and if the permissions information indicates that the operations are not permitted, then the method 500 does not proceed.

At step 504, the memory access engine 120 translates the virtual addresses specified by the memory access command 304. More specifically, the memory access command 304 specifies source and destination, which includes memory addresses. These memory addresses specify the data of the source that is to be copied (e.g., with transformation as described elsewhere herein) as well as the location at the destination into which the data is to be copied. These memory addresses can be specified as virtual addresses, in which case, to perform the requested operations, the memory addresses should be translated. As described elsewhere herein, translating these addresses includes sending translation requests to the address translation engine 122 and receiving the translated addresses. The pipelined nature of the execution pipeline 206 allows translation requests for multiple address ranges or commands 304 to be processed concurrently.

At step 506, in a pipelined manner, the memory access engine 120 executes operations for the commands 304, using the translated addresses. As described elsewhere herein, executing these operations includes generating requests to the memory system 104 to perform the operations requested by the commands 304. In some examples, the operations include copying data from the source to the destination. In some examples, the operations include performing one or more transformations on the data and copying the transformed data to the destination. As described above, these operations are performed in a pipelined manner, meaning that multiple such operations can be outstanding at any given point in time.

In some implementations, the method 500 includes additional steps after step 506. In an example, the method 500 includes performing write-back operations as specified by the command 304. In an example, a write-back operation includes transmitting back to the source (e.g., to the virtual machine associated with the source) that is the result of the command 304 being executed. In an example, the command specifies a read-modify-write operation, and the write-back data includes the data at the destination before being modified. In various implementations, the command 304 is permitted to specify any form of write-back data, and, in such implementations, such write-back data is provided back to the source in response to the command 304 completing. In addition, in some examples, the memory access engine 120 provides a notification to the source (e.g., to the virtual machine associated with the source) that the command 304 is complete.

In some examples, various addresses specified by the memory access command 304 are system physical addresses. In such examples, the associated translation steps are not performed. For example, addresses of the source or destination may be specified as system physical addresses, in which case translation of those addresses is not performed. For processing that command 304, operations for translating the source and destination addresses are not performed. In such examples, operations for translating the addresses of the metadata and/or permissions information may still be performed.

The elements in the figures are embodied as, where appropriate, software executing on a processor, a fixed-function processor, a programmable processor, or a combination thereof. The processor 102, interconnect 112, memory 104, storage 108, various auxiliary devices 106, and elements thereof, memory access engine 120, and address translation engine 122, as well as the components of the memory access engine 120 (such as the various pipeline stages described), include at least some hardware circuitry and, in some implementations, include software executing on a processor within that component or within another component.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for servicing a memory request, the method comprising:
   processing a first memory request from a first client concurrently with a second memory request from a second client in an execution pipeline, the execution pipeline including different stages where each of the stages is configured to process a different part of the first memory request at different times,
   wherein the processing of the first memory request includes:
      obtaining permissions associated with a source and a destination specified by information included within the first memory request, wherein the source and the destination specify multiple non-contiguous memory address ranges for access for the first memory request;
      obtaining a set of address translations for the first memory request, the obtaining including generating multiple requests for address translation for the multiple non-contiguous memory address ranges; and
   executing operations for the memory request, using the set of address translations.

2. The method of claim 1, further comprising fetching the memory request from a queue associated with a client that generated the memory request.

3. The method of claim 1, wherein the memory request specifies the source and the destination, wherein the source is associated with a first virtual machine and the destination is associated with a second virtual machine.

4. The method of claim 1, wherein obtaining the permissions includes translating one or more addresses of metadata associated with permission information, to obtain one or more metadata address translations.

5. The method of claim 4, further comprising:
   obtaining one or more addresses of the permission information from within the metadata, by accessing the metadata using the one or more metadata address translations; and
   translating the one or more addresses of the permission information to obtain translated addresses for permission information.

6. The method of claim 5, further comprising obtaining the permission information using the translated permissions information addresses.

7. The method of claim 1, further comprising:
   receiving the memory request from a queue associated with a client.

8. The method of claim 7, wherein receiving the memory request from the queue comprises arbitrating between a plurality of queues, wherein each queue of the plurality of queues stores requests from different clients.

9. A memory access engine, comprising:
   an execution pipeline; and
   a plurality of queues,
   wherein the execution pipeline is configured to:
      process a first memory request from a first client concurrently with a second memory request from a second client in an execution pipeline, the execution pipeline including different stages where each of the stages is configured to process a different part of the same memory request at different times,
      wherein the processing of the first memory request includes:
         obtaining permissions associated with a source and a destination specified by information included within the first memory request, wherein the source and the destination specify multiple non-contiguous memory address ranges for access for the first memory request;
         obtaining a set of address translations for the memory request, the obtaining including generating multiple requests for address translation for the multiple non-contiguous memory address ranges; and
         executing operations for a first request, using the set of address translations.

10. The memory access engine of claim 9, wherein the execution pipeline is further configured to fetch the memory request from a queue associated with a client that generated the memory request.

11. The memory access engine of claim 9, wherein the memory request specifies the source and the destination, wherein the source is associated with a first virtual machine and the destination is associated with a second virtual machine.

12. The memory access engine of claim 9, wherein obtaining the permissions includes translating one or more addresses of metadata associated with permission information, to obtain one or more metadata address translations.

13. The memory access engine of claim 12, wherein the execution pipeline is further configured to:
   obtain one or more addresses of the permission information from the metadata, using the one or more metadata address translations; and
   translate the one or more addresses of the permission information to obtain translated permission information addresses.

14. The memory access engine of claim 13, wherein the execution pipeline is further configured to obtain the permission information using the translated permissions information addresses.

15. The memory access engine of claim 9, wherein the memory access engine is further configured to:
   receiving the memory request from a queue associated with a client.

16. The memory access engine of claim 15, wherein receiving the memory request from the queue comprises arbitrating between a plurality of queues, wherein each queue of the plurality of queues stores requests from different clients.

17. A device, comprising:
one or more processors executing a plurality of virtual machines; and
a memory access engine, comprising:
an execution pipeline; and
a plurality of queues,
wherein the execution pipeline is configured to:
process a first memory request from a first client concurrently with a second memory request from a second client in an execution pipeline, the execution pipeline including different stages where each of the stages is configured to process a different part of the same memory request at different times,
wherein the processing of the first memory request includes:
obtaining permissions associated with a source and a destination specified by information included within the first memory request, wherein the source is associated with a first virtual machine of the plurality of virtual machines and the destination is associated with a second virtual machine of the plurality of virtual machines, wherein the source and the destination specify multiple non-contiguous memory address ranges for access for the first memory request;
obtaining a set of address translations for the first memory request, the obtaining including generating multiple requests for address translation for the multiple non-contiguous memory address ranges; and
executing operations for a first request, using the set of address translations.

18. The device of claim 17, wherein the execution pipeline is further configured to fetch the memory request from a queue associated with a client that generated the memory request.

19. The device of claim 17, wherein the memory request specifies the source and the destination, wherein the source is associated with a first virtual machine and the destination is associated with a second virtual machine.

20. The devices of claim 17, wherein obtaining the permissions includes translating one of more addresses of metadata associated with permission information, to obtain one of more metadata address translations.

* * * * *